Dec. 20, 1960   W. E. GUNDELFINGER ET AL   2,965,345
STAND FOR KITCHEN APPLIANCES
Filed May 29, 1958
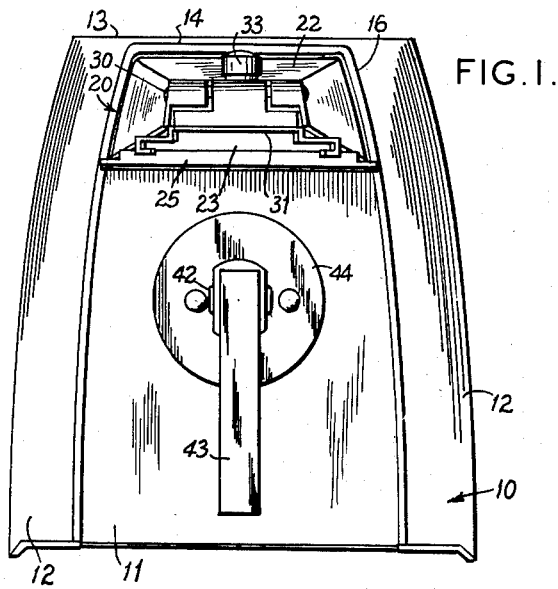
FIG. 1.
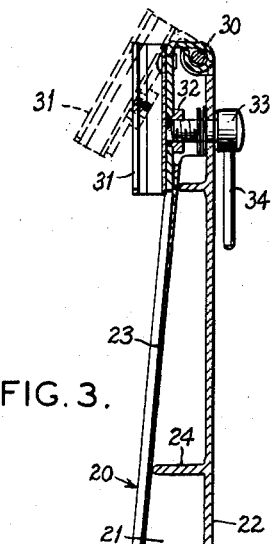
FIG. 3.
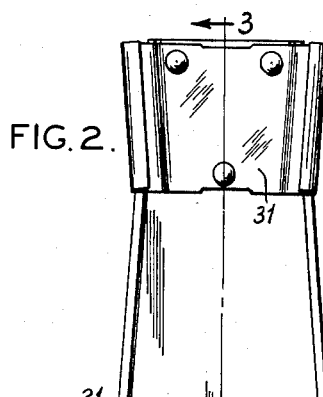
FIG. 2.
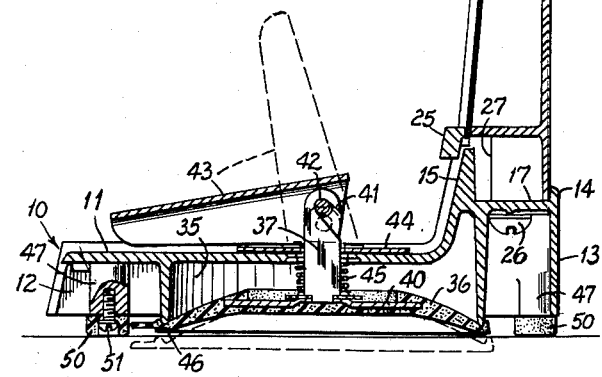
FIG. 4.
INVENTORS,
WILLIAM E. GUNDELFINGER.
AND ALOIS C. HOOG
BY Cohn and Powell
ATTORNEYS.
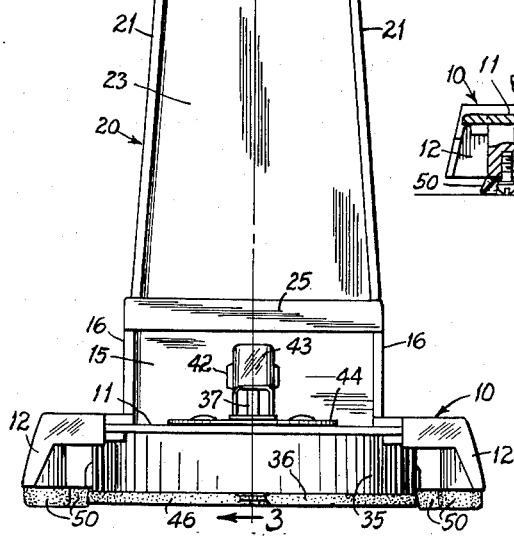

United States Patent Office 2,965,345
Patented Dec. 20, 1960

2,965,345

STAND FOR KITCHEN APPLIANCES

William E. Gundelfinger, House Spring, and Alois C. Hoog, St. Louis, Mo., assignors to The Dazey Corporation, St. Louis, Mo., a corporation of Missouri Filed May 29, 1958, Ser. No. 738,687

3 Claims. (Cl. 248—122)

This invention relates generally to improvements in a stand for kitchen appliances, and more particularly to an improved mechanism for detachably mounting the stand on a subjacent supporting surface.

It is an important object to provide a mounting for an appliance stand capable of being detachably connected to any flat non-porous surface such as a kitchen counter or table without causing any damage to such surface. Other advantages are realized in that the stand can be attached and detached selectively and moved to any desired location for use.

An important objective is achieved by the structural arrangement of a vacuum cup relative to a resilient support on the stand base so that the cup can be held out of operative engagement with the subjacent surface, and yet capable of being moved into sealing relation when desired. The resilient support is compressible upon actuation of the vacuum cup in creating a suction to enable a shoulder on the base to descend and engage the vacuum cup periphery so as to form a seal.

Another important object is realized by the provision of a bracket hingedly connected on the stand, the bracket being adapted to retain an appliance above the stand base, and by the provision of a vacuum attachment on the base in which the actuating means is located on the base below the bracket and below the position of the appliance when attached. The bracket is detachably retained in a fixed position when the appliance is used, and is releasable to allow the appliance to swing upwardly to clear the base and actuating means.

The above discussed structural and functional advantages are particularly important when the stand is utilized to hold an appliance such as an ice crusher having a detachable bottom receptacle, in order to facilitate removal of the receptacle and yet maintain attachment of the ice crusher with the bracket.

Still another important object is to provide a detachable mounting for an appliance stand that is simple and durable in construction, economical to manufacture and assemble, efficient in operation, and which can be readily operated by anyone.

The foregoing and numerous other objects and advantages of the invention will more clearly appear from the following detailed description of a preferred embodiment, particularly when considered in connection with the accompanying drawing, in which:

Fig. 1 is a top plan view of the stand;

Fig. 2 is a front elevational view of the stand shown in Fig. 1;

Fig. 3 is a cross-sectional view of the stand as seen along line 3—3 of Fig. 2. The vacuum cup is shown in its normal retracted position in full lines, and is shown in its extended position in dotted lines. The appliance bracket is shown in its fixed position in full lines and is shown in its released tilted position in dashed lines, and Fig. 4 is a fragmentary cross sectional view of the vacuum cup of Fig. 3, but showing the cup in its retracted operable position attaching the stand to a subjacent surface.

Referring now by characters of reference to the drawing, it is seen that the stand consists of a base generally indicated at 10 having a top wall 11 and depending side flanges 12. The base 10 is open at the front, and is closed at the rear by rear wall 13, best shown in Fig. 3.

A standard support is provided at the rear of the base 10, the support consisting of an upward extension 14 of rear wall 13, a front wall 15 extending upwardly from the top wall 11 of base 10, interconnecting side flanges 16 between rear and front wall portions 14—15, and a bottom wall 17. The walls 14-17 inclusive provide a socket and seat for a standard generally indicated at 20.

The standard 20 consists of a U-shaped channel having side flanges 21 interconnected by a rear web 22. A front panel 23 is disposed in bridging relation to the side flanges 21 and closes the open side of the channel. It is seen from Fig. 3 that a plurality of horizontal shoulders 24 project forwardly horizontally from the channel web 22, the shoulders 24 serving to position the front panel 23.

As is best shown in Figs. 2 and 3, the standard 20 tapers upwardly as illustrated by the upwardly converging relation of side flanges 21 in Fig. 2, and as illustrated by the inclined relation of front panel 23 in Fig. 3.

The lower end of standard 20 is adapted to interfit and seat in the socket formed by the standard support at the rear of the base 10. For example, the lowermost portions of side flanges 21 and web 22 seat on the bottom wall 17 inside of the support walls 14–16 inclusive. A bar 25 is fixed to the side flanges 21 and is positioned in front of the panel 23. The bar 25 is adapted to fit over the front wall 15 of the standard support, hence serving to facilitate positioning of the standard 20 in such support.

The standard 20 is retained on the base 10 by a plurality of screws 26 extending upwardly through the bottom wall 17 and threadedly engaging standard portions 27.

Hingedly connected by pin 30 to the top of standard 20 is a bracket 31 adapted to hold an appliance such as a can opener, ice crusher or the like. A nut 32 is fixed to the rear of bracket 31. Rotatively mounted in the web 22 of standard 20 is a screw 33 adapted to engage threadedly the nut 32. The screw 33 is provided with a handle 34 to facilitate manipulation of the screw incident to clamping and releasing the bracket 31.

As is seen from Fig. 3, the screw 33 may be turned to engage the nut 32, and hence clamp the bracket 31 to the top of the standard 20. This position is shown in full lines. As will be explained more fully in subsequent description of structure and operation, it is sometimes desirable or necessary to tilt the appliance attached to bracket 31 to effect release of a portion of the appliance. To accomplish this action, the screw 33 is threadedly released from nut 32, hence permitting the bracket 31 to swing upwardly about its hinge connection 30 to a position shown in dashed lines in Fig. 3.

Formed integrally with the top wall 11 of base 10 is a depending circular housing 35 in which a vacuum cup 36 formed of resilient material such as rubber, is received. An arm 37 is attached to a plate 40 embedded in cup 36, the arm 37 extending upwardly through the top wall 11 of base 10. The upper portion of arm 37 is provided with a hook 41 in which a pivot pin 42 of lever 43 is located. A buffer plate 44 is provided on top of base wall 11 around the arm 37. Located about arm 37 in housing 35 between the top base wall 11 and the vacuum cup 36 is a compression spring 45 that tends to urge the vacuum cup outwardly to an extended position with respect to the housing 35.

In its normal inoperative position as illustrated in full lines in Fig. 3, the vacuum cup 36 is retracted in the housing 35 so that the lowermost peripheral margin or shoulder 46 engages the top periphery of cup 36. In this position the arm 37 is raised through the top base wall 11, and lever 43 is disposed in the lowered horizontal position.

To extend the vacuum cup with respect to housing 35, the lever 43 is raised to the position shown in dashed lines in Fig. 3, which action causes arm 37 to be lowered through the top base wall 11 and cup 36 lowered below housing 35 to the position in dashed lines in Fig. 3.

A plurality of legs 47 are formed on base 10, the legs 47 including foot portions 50 formed of resilient material such as rubber, secured by screws 51. The resilient foot portions 50 constituting a resilient support, are adapted to seat on a subjacent supporting surface such as a kitchen counter top or table top. The housing 35 and the vacuum cup 36 are disposed between the resilient foot portions 50.

As will be seen from Figs. 2 and 3, the vacuum cup 36 in its retracted inoperative position is located above the bottom of the resilient foot portions 50. In this position the vacuum cup 36 is free from any attachment with the subjacent surface. Thus, the stand can be easily moved from one position to another, the stand being supported only by the foot portions 50.

It is thought that the operation and functional advantages of the appliance stand have become fully apparent from the foregoing detailed description of the parts and structural arrangement, but for completeness of disclosure the operation of the vacuum attachment and of the hinged bracket will be further described.

For purposes of description, it will be assumed that the vacuum cup 36 is disposed initially in its normal inoperative position illustrated in full lines in Fig. 3, and that it is desired to fasten the stand to a subjacent supporting surface.

In order to accomplish such attachment, the lever 43 is raised to the position shown in dashed lines in Fig. 3 which causes the vacuum cup 36 to move to the extended position shown in dashed lines. In actual practice, the cup 36 engages the subjacent surface and raises the resilient foot portions 50 off of such surface. Then, the vacuum cup 36 is retracted by lowering lever 43 and raising arm 37. Upon retraction of cup 36, a vacuum between the cup and the supporting surface is formed. Furthermore, upon retraction of the vacuum cup 36, the housing shoulder 46 is brought down into clamping engagement with the periphery of the cup 36 to provide an effective seal between the cup and supporting surface.

In order for the housing shoulder 46 to afford this clamping engagement with the vacuum cup 46 and to provide the air seal, the resilient foot portions 50 are compressed upon engagement with the supporting surface as is illustrated in Fig. 4. It is seen that this compressive action of the foot portions 50 must take place to compensate for the normal spacing between the supporting surface and the vacuum cup 36 and housing shoulder 46 shown in Fig. 3. The stand is now attached securely to the supporting surface.

To release the vacuum attachment, the lever 43 is subsequently raised which causes the housing shoulder 46 to move upwardly and out of engagement with the top periphery of the vacuum cup 36. The effective air seal provided by the clamping engagement of the housing shoulder 46 with the vacuum cup 36 is hence broken and the cup 36 may be removed from the supporting surface. Then, the stand is lifted and the lever 46 lowered to bring the cup 36 to its retracted position as shown in full lines in Fig. 3.

It will be noted that the actuating means for the vacuum cup attachment is located immediately below the hinged bracket 31. Depending upon the type of appliance attached to the bracket 31 there may be some interference in the operation of the lever arm 43 when the appliance is attached, or in the removal of some portion of the appliance.

For example, when an ice crusher is attached to the bracket 31 the receptacle of the ice crusher is located immediately above the lever 43. In order to remove the receptacle of the crusher and yet maintain attachment of the ice crusher with the bracket 31, the bracket is released from its screw attachment and swung upwardly to the position shown in dashed lines in Fig. 3. Upon swinging the crusher and the bracket 31 to an inclined position, the receptacle of the crusher may be detached and removed, the receptacle in the inclined position clearing the base 10 and actuating means 43.

After the receptacle of the ice crusher is emptied, it is then attached to the crusher while the bracket 31 and crusher are in the inclined position as determined by the hinged bracket 31. After attachment, the ice crusher and the bracket are moved downwardly to the normal position. Then, the screw 33 is tightened into nut 32 to fix the bracket 31 in position on the standard 20.

Although the invention has been described by making detailed reference to a single preferred embodiment, such detail is to be understood in an instructive, rather than in any restrictive sense, many variants being possible within the scope of the claims hereunto appended.

We claim as our invention:

1. An appliance stand comprising a base, a standard on the base, means for attaching an appliance to the standard, a housing on the base, a vacuum cup mounted in said housing and adapted to engage operatively a subjacent surface, means attached to the vacuum cup for extending and retracting said cup, the housing including a peripheral shoulder engaging the cup to provide a seal when the cup is extended and then retracted to form a vacuum, and a resilient support on the base and normally extending beyond the said shoulder and cup when the cup is retracted and free from the subjacent surface, the vertical distance between the lower end of the support and the abutting margin of said shoulder being greater than the thickness of said cup below said shoulder when the support is uncompressed, while said distance is no greater than the cup thickness when the support is compressed.

2. An appliance stand comprising a base, a standard on the base, means for attaching an appliance to the standard, a resilient support on the base adapted to engage a subjacent surface, a vacuum cup on the base, means attached to the cup for extending and retracting the said cup, a sealing shoulder on the base engaging the top periphery of the cup in the retracted position, the cup and shoulder being spaced above the bottom of the resilient support when the cup is retracted and free from the subjacent surface, the resilient support being compressible to afford a tight seal between the cup and subjacent surface by engagement of the shoulder with said cup upon actuation of the cup to an extended position to engage the surface and then to a retracted position to form a suction, the vertical distance between the lower end of the support and the abutting margin of said shoulder being greater than the thickness of said cup below said shoulder when the support is uncompressed while said distance is no greater than the cup thickness when the support is compressed.

3. An appliance stand comprising a base, a standard on the base, means for attaching an appliance to the standard, a resilient support on the base adapted to engage a subjacent surface, a vacuum cup mounted on the base, an arm attached to the cup and extending upwardly through the top of the base, a lever connected to the arm for raising and lowering the arm incident to retracting and extending the said cup, a sealing shoulder on the base engaging the top periphery of the cup in the retracted position, the cup and shoulder being spaced above the bottom of the resilient support when the cup is retracted and free from the subjacent surface, the cup extending below the bottom of said support when extended to the subjacent surface, the resilient support being compressible to afford a tight seal between the cup and subjacent surface by engagement of the shoulder with the cup upon actuation of the cup to an extended position to engage the surface and then to a retracted position to form a suction, the distance between the bottom of the support and shoulder being greater than the thickness of the cup below said shoulder when the support is uncompressed, while the said distance is less than the thickness of the cup below said shoulder when the support is compressed.

References Cited in the file of this patent

UNITED STATES PATENTS

| | | |
|---|---|---|
| 914,776 | Aarons | Mar. 9, 1909 |
| 1,000,858 | Ulrich | Aug. 15, 1911 |
| 1,006,315 | Toth | Oct. 17, 1911 |
| 2,351,666 | Cohen | June 20, 1944 |

FOREIGN PATENTS

| | | |
|---|---|---|
| 651,820 | Germany | Oct. 20, 1937 |